United States Patent
Bierhuizen et al.

(10) Patent No.: US 9,772,550 B2
(45) Date of Patent: Sep. 26, 2017

(54) APPARATUS, SYSTEM AND METHOD FOR MITIGATING CONTRAST ARTIFACTS AT AN OVERLAP REGION OF A PROJECTED IMAGE

(71) Applicant: X Development LLC, Mountain View, CA (US)

(72) Inventors: Serge Joel Armand Bierhuizen, San Jose, CA (US); Philip Edwin Watson, Mountain View, CA (US); Adam Eales Norton, Palo Alto, CA (US); Andrei Kazmierski, Pleasanton, CA (US)

(73) Assignee: X Development LLC, Mountain View, CA (US)

( * ) Notice: Subject to any disclaimer, the term of this patent is extended or adjusted under 35 U.S.C. 154(b) by 138 days.

(21) Appl. No.: 14/818,233

(22) Filed: Aug. 4, 2015

(65) Prior Publication Data
US 2017/0038669 A1   Feb. 9, 2017

(51) Int. Cl.
*G03B 21/625* (2014.01)
*G02B 27/30* (2006.01)
(Continued)

(52) U.S. Cl.
CPC .......... *G03B 21/625* (2013.01); *G02B 3/08* (2013.01); *G02B 27/30* (2013.01); *G03B 21/13* (2013.01);
(Continued)

(58) Field of Classification Search
CPC .... G03B 21/625; G03B 21/13; G03B 21/602; H04N 9/3147
See application file for complete search history.

(56) References Cited

U.S. PATENT DOCUMENTS 5,477,380 A * 12/1995 Watanabe ............ G03B 21/625
                                                   348/E5.137
5,510,915 A   4/1996 Ge et al.
(Continued)

FOREIGN PATENT DOCUMENTS

WO    WO0017700 A1    3/2000

OTHER PUBLICATIONS

PCT/US2016/043010—International Search Report and Written Opinion, dated Sep. 30, 2016, 12 pages.
(Continued)

*Primary Examiner* — Christopher Mahoney
(74) *Attorney, Agent, or Firm* — Christensen O'Connor Johnson Kindness PLLC

(57) ABSTRACT

Techniques and mechanisms to provide for improved image display in an area of overlapping projections. In an embodiment, a multi-layer projection screen comprises light sources and collimation structures each disposed over a corresponding one of such light sources. A first collimation structure disposed over a first light source collimates first light from the first light source. The first collimation structure further receives and redirects second light from a second light source disposed under a second collimation structure that adjoins the first collimation structure. In another embodiment, the first collimation structure redirects the other light from the second light source away from the direction of collimation of the first light. A stray light rejection layer of the multi-layer projection screen passes a majority of the first light for inclusion as part of a projected image, and prevents a majority of the second light from inclusion in the projected image.

21 Claims, 11 Drawing Sheets

(51) Int. Cl.
*G02B 3/08* (2006.01)
*G09G 3/36* (2006.01)
*H04N 9/31* (2006.01)
*G03B 21/13* (2006.01)
*G03B 37/04* (2006.01)

(52) U.S. Cl.
CPC .............. *G03B 37/04* (2013.01); *G09G 3/36* (2013.01); *H04N 9/3147* (2013.01); *G09G 2320/0266* (2013.01)

(56) References Cited

U.S. PATENT DOCUMENTS

| | | |
|---|---|---|
| 5,563,738 A | 10/1996 | Vance |
| 5,724,182 A | 3/1998 | Mitani et al. |
| 5,781,344 A | 7/1998 | Vance |
| 6,118,584 A | 9/2000 | Van Berkel et al. |
| 6,128,054 A | 10/2000 | Schwarzenberger |
| 6,449,089 B1 | 9/2002 | Moshrefzadeh et al. |
| 6,466,368 B1 | 10/2002 | Piepel et al. |
| 6,469,830 B1 | 10/2002 | Dubin et al. |
| 6,520,643 B1 | 2/2003 | Holman et al. |
| 6,535,333 B1 | 3/2003 | Piepel |
| 6,611,241 B1 | 8/2003 | Firester et al. |
| 6,636,355 B2 | 10/2003 | Moshrefzadeh et al. |
| 6,754,005 B2 | 6/2004 | Goto et al. |
| 6,765,720 B2 | 7/2004 | Morris et al. |
| 6,829,086 B1 | 12/2004 | Gibilini |
| 7,233,439 B2 | 6/2007 | Shimizu |
| 7,443,583 B2 | 10/2008 | Yamauchi |
| 7,453,635 B2 | 11/2008 | Yeo et al. |
| 7,706,073 B2 | 4/2010 | Munro |
| 7,854,519 B2 | 12/2010 | Akiyama |
| 7,907,112 B2 | 3/2011 | Chang et al. |
| 7,980,716 B2 | 7/2011 | Hirata et al. |
| 8,004,760 B2 | 8/2011 | Liu et al. |
| 8,233,217 B2 | 7/2012 | Kindler et al. |
| 8,369,012 B2 | 2/2013 | Hannington |
| 9,013,790 B1 | 4/2015 | Kazmierski et al. |
| 9,176,370 B1* | 11/2015 | Norton ................ G03B 21/625 |
| 2001/0040263 A1 | 11/2001 | Nakai |
| 2002/0109916 A1 | 8/2002 | Moshrefzadeh |
| 2003/0184993 A1 | 10/2003 | Yamada |
| 2003/0206342 A1 | 11/2003 | Reed et al. |
| 2004/0233541 A1 | 11/2004 | Mori et al. |
| 2005/0018287 A1 | 1/2005 | Miyata et al. |
| 2005/0041287 A1 | 2/2005 | Goto |
| 2005/0200953 A1 | 9/2005 | Sekiguchi et al. |
| 2006/0061861 A1* | 3/2006 | Munro ................ G03B 21/625 359/456 |
| 2006/0087732 A1 | 4/2006 | Shinbo |
| 2006/0209403 A1 | 9/2006 | Parusel et al. |
| 2006/0268404 A1 | 11/2006 | Hyobu |
| 2007/0115548 A1 | 5/2007 | Ebina et al. |
| 2007/0159691 A1 | 7/2007 | Fukano et al. |
| 2007/0171523 A1 | 7/2007 | Yoon |
| 2009/0009861 A1* | 1/2009 | Hyobu ................ G02B 5/0242 359/456 |
| 2009/0091824 A1 | 4/2009 | Yamashita et al. |
| 2010/0214196 A1 | 8/2010 | Browaeys |
| 2010/0271721 A1 | 10/2010 | Gaides et al. |
| 2011/0157887 A1 | 6/2011 | Jeong et al. |
| 2012/0244910 A1 | 9/2012 | Hsu |
| 2013/0076737 A1 | 3/2013 | Park et al. |
| 2013/0300637 A1 | 11/2013 | Smits et al. |
| 2015/0023051 A1 | 1/2015 | Jepsen et al. |

OTHER PUBLICATIONS

U.S. Appl. No. 14/750,799, filed Jun. 25, 2015, Norton, et al.
U.S. Appl. No. 14/303,163, filed Jun. 12, 2014, Norton, et al.
U.S. Appl. No. 14/543,616, filed Nov. 17, 2014, Fu, et al.
Duparre', J. et al., "Novel Optics/Micro-Optics for Miniature Imaging Systems", Fraunhofer Institute for Applied Optics and Precision Engineering, SUSS MicroOptics SA (2006) 15 pages.
Wolfe, C.R. et al., "Characterization of BlackScreen™ for Rear-Projection Television", Proc. of SPIE vol. 5002 (2003) Downloaded From: http://spiedigitallibrary.org/ on Nov. 19, 2013, pp. 97-105.
Morris, G.M. et al., "Engineered diffusers™ for display and illumination systems: Design, fabrication, and applications", www.RPCphotonics.com, downloaded from Internet prior to Jun. 12, 2014, 11 pages.
Sales, Tasso R.M. et al., "Light Tamers Engineered microlens arrays provide new control for display and lighting applications", Photonics Spectra, Reprinted from the Jun. 2004 issue of Photonics Spectra, 4 pages.
VikuitiTM, "Vikuiti™ Rear Projection Film", Vikuiti Display Enhancement 3M, Data sheet Oct. 2006, 3M Optical Systems Division, 6 pages.
VikuitiTM, "Vikuiti™ Rear Projection Display Screen", Vikuiti Projection Display Components 3M, 3M Optical Systems Division, downloaded from Internet prior to Jun. 12, 2014, 8 pages.

* cited by examiner

APPARATUS, SYSTEM AND METHOD FOR MITIGATING CONTRAST ARTIFACTS AT AN OVERLAP REGION OF A PROJECTED IMAGE

BACKGROUND

1. Technical Field

This disclosure relates generally to the field of optics, and in particular but not exclusively, relates to display screens.

2. Background Art

Conventional rear projection screens use a thin diffusing layer in the form of a matte screen. An image is projected onto the back of the diffusing layer, where it is diffused and scattered into the viewing environment. The diffusing layer provides an image surface and its diffusive nature serves to increase the viewing angles from which the image can be observed. In order to provide good image quality, it is desirable for these projection screens to provide high image contrast and sharp image quality.

Conventional rear projection screens often suffer from poor image contrast in well-lit rooms, at least in part, from the scattering of ambient light back into the viewing environment. This backscattered ambient light deleteriously affects the black levels, and therefore contrast, of the rear projection screen. Furthermore, conventional rear projection screens often suffer from reduced image sharpness or image blur due to stray light in the projection path preceding the image plane of the projection screen. Stray light (i.e., display light with sufficiently large non-normal angles) emitted from the display source at a given display pixel location should be prevented from entering the optical path reserved for an adjacent display pixel prior to the display light reaching the image plane.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
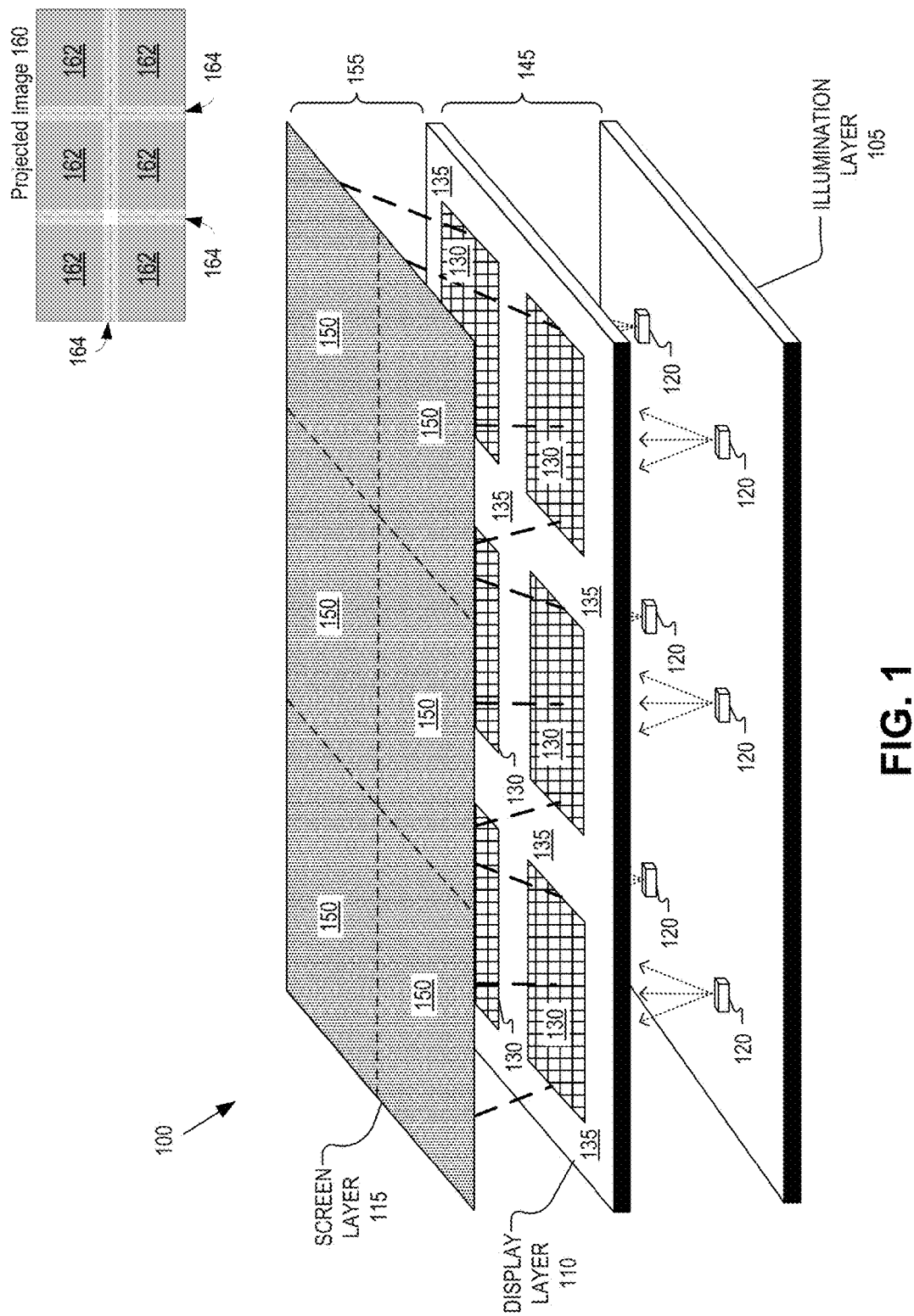
FIG. 1 is a perspective view illustrating functional layers of a rear projection display, in accordance with an embodiment of the disclosure.

Embodiments of an apparatus, system, and method for providing a high contrast image projection with stray light rejection are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain embodiments include a multi-layer projection screen comprising light sources each to emit respective light, and collimation structures each disposed over a corresponding one of such light sources. One collimation structure disposed over a first light source may collimate first light from the first light source. The collimation structure may further receive and redirect other light from a second light source disposed under an adjoining collimation structure. In an embodiment, the collimation structure redirects the other light from the second light source away from the direction of collimation of the first light. A stray light rejection layer may pass a majority of the first light for inclusion as part of a projected image display, but prevent a majority of the second light from inclusion in the projected image display.

A collimation structure according to an embodiment may increase angularly separation between respective light received from different sources, where such increased angular separation enables a subsequent selective passing and displaying of only some of the angularly separated light. A given collimation structure may include some or all of one or more films, plates or other components comprised of light transmissive material. In some embodiments, a collimation structure is physically detached or otherwise distinct from another collimation structure adjacent thereto. Alternatively, such adjoining collimation structures may be integrated with one another into a common layer of material, layer stack or the like. Different collimation structures may be distinguished from one another by respective patterns of facets of such collimation structures—e.g., where each collimation structure has a respective light collimating pattern that is symmetric about a different respective plane or axis extending through that collimation structure.

Certain features of various embodiments are described herein with reference to a display system that projects light from different illumination sources through respective pixel arrays onto various collimation structures. However, such description may be extended to also apply to any of a variety of additional or alternative types of display systems, according to different embodiments. For example, some embodiments are not limited with respect to a particular type of source of image light or to a particular structure or structures through which light might (or might not) pass prior to incidence of such light onto collimation structures having features such as those described herein. Accordingly, some embodiments may be adapted for operation with, or as part of, any of a variety of otherwise conventional display systems, the features of which are not detailed herein and are not limiting on some embodiments.

FIG. 1 is a perspective view illustrating functional layers of an example rear projection display 100, in accordance with an embodiment of the disclosure. The illustrated embodiment of display 100 includes an illumination layer 105, a display layer 110, and a screen layer 115. Screen layer 115 represents any of various multi-layer projection screens having features described herein. It should be appreciated that the rear projection screens disclosed above may also be used in connection with other projection architectures as well.

The illustrated embodiment of illumination layer 105 includes an array of illumination sources 120. The illustrated embodiment of display layer 110 includes transmissive pixel arrays 130 separated from each other by spacing regions 135. The illustrated embodiment of screen layer 115 is divided into regions for displaying image portions 150 of an overall unified image. Rear projection display 100 is made up of a plurality of pixel arrays (e.g., pixlets), each including an illumination source 120, transmissive pixel array 130, and a screen region for displaying an image portion 150 all aligned within a column through display 100.

In the illustrated embodiment, each illumination source 120 is aligned under a corresponding pixel array 130 to illuminate a backside of the corresponding pixel array with lamp light. Illumination sources 120 may be implemented as independent light sources (e.g., color or monochromatic LEDs, quantum dots, etc.) that emit light with a defined angular spread or cone to fully illuminate their corresponding transmissive pixel array 130 residing above on display layer 110. The illumination layer 105 and display layer 110 are separated from each other by a fixed distance 145 (e.g., 8 mm). This separation may be achieved using a transparent intermediary (e.g., glass or plastic layers) and may further include one or more lensing layers (including lenses, apertures, beam confiners, etc.) to control or manipulate the angular extent and cross-sectional shape of the lamp light emitted from illumination sources 120. In one embodiment, an illumination controller may be coupled to illumination sources 120 to control their illumination intensity. Illumination layer 105 may include a substrate upon which illumination sources 120 are disposed.

Transmissive pixel arrays 130 are disposed on the display layer 110 and each includes an array of transmissive pixels (e.g., 100 pixels by 100 pixels). In one embodiment, the transmissive pixels may be implemented as backlit liquid crystal pixels. Each transmissive pixel array 130 is an independent display array that is separated from adjacent transmissive pixel arrays 130 by spacing regions 135 on display layer 110. The internal spacing regions 135 that separate adjacent pixel arrays 130 from each other may be twice the width as the perimeter spacing regions 135 that separate a given pixel array 130 from an outer edge of display layer 110. In one embodiment, the internal spacing regions 135 have a width of 4 mm while the perimeter spacing regions 135 have a width of 2 mm. Of course, other dimensions may be implemented.

As illustrated, transmissive pixel arrays 130 are spaced across display layer 110 in a matrix with spacing regions 135 separating each transmissive pixel array 130. In one embodiment, transmissive pixel arrays 130 each represent a separate and independent array of display pixels (e.g., backlit LCD pixels). Spacing region 135 are significantly larger than the inter-pixel separation between pixels of a given transmissive pixel array 130. Spacing regions 135 provide improved flexibility for routing signal lines or the inclusion of additional circuitry, such as a display controller. Spacing regions 135 that reside along the exterior perimeter of display layer 110 also provide space for a bezel trim of display 100. The spacing regions 135 that reside along the exterior perimeter also provide space for power and/or communication ports.

Although FIG. 1 illustrates display layer 110 as including six transmissive pixel arrays 130 arranged into two rows and three columns, it should be appreciated that various implementations of display 100 may include more or less transmissive pixel arrays 130 organized into differing combinations of rows and columns. As such, in embodiments having a one-to-one ratio of illumination sources 120 to transmissive pixel arrays 130, the number and layout of illumination sources 120 on illumination layer 105 may also vary. While FIG. 1 does not illustrate intervening layers between the three illustrated layers for the sake of clarity, it should be appreciated that embodiments may include various intervening optical or structural sub-layers, such as lens arrays, transparent substrates to provide mechanical rigidity and optical offsets, protective layers, or otherwise. Furthermore, screen layer 115 may in fact be implemented as a multi-layer projection screen, such as any of various multi-layer projection screens described herein. Display layer 110 represents one possible implementation of a display panel and illumination layer 105 illustrates one possible implementation of multiple illumination sources.

Transmissive pixel arrays 130 are switched under control of a display controller to modulate the lamp light and project image portions 150 onto a backside of screen layer 115. Image portions 150 collectively blend together on screen layer 115 to present a unified image to a viewer from the viewing side of screen layer 115 that is substantially without seams. In other words, the images created by transmissive pixel arrays 130 are magnified as they are projected across separation 155 (e.g., 2 mm) between display layer 110 and screen layer 115. The image portions 150 are magnified enough to extend over and cover spacing regions 135 forming a seamless unified image. The magnification factor is dependent upon separation 155 and the angular spread of the lamp light emitted by illumination sources 120. In one embodiment, image portions 150 are magnified by a factor of approximately 1.5. Not only does the unified image cover the internal spacing regions 135, but also covers the perimeter spacing regions 135. As such, display 100 may be positioned adjacent to other display tiles 100 and communicatively interlinked to form larger composite seamless displays, in which case the unified image generated by a single display tile becomes a sub-portion of a multi-tile unified image.

To achieve the appearance of a seamless multi-projection image, the constraints of mechanical alignment tolerances typically require some sort or overlap region between portions of the overall projected image. Rear projection display 100 is just one example of a system that, like most conventional projection display systems, has multiple projection elements variously illuminating different respective regions that overlap one another. As illustrated by the example image 160 shown, respective projections of different image portions 162 of image 160 may require some overlap regions 164 (to provide a seamless overall image display) where light from different light sources illuminate the same region at an edge of at least one diffuser layer. Where the projected images overlap in current projection displays, a 2× (or 4×) reduction in contrast tends to result. In conventional techniques, this could be addressed by increasing an overall black level for all image portions. For example, a native 400:1 contrast image would be adjusted to only 200:1 (or 100:1) after such gray scale correction. However, such contrast reduction can affect image quality, and in seamless tiled display solutions (for example), such contrast reduction would not work well with the use of LCD shadow-casting technology to meet the contrast needs for broad market acceptance.

Rear projection display 100 is just one example of any of a variety of display systems, according to different embodiments, that variously project respective light from multiple sources, directly or indirectly, onto collimation structures, where some portion of the collimation structures receives overlapping light from different sources. Other embodiments omit structures such as display layer 110—e.g., where a portion of an image is instead projected by a different type of light source directly onto collimator structures of screen layer 115.

Figure 2:
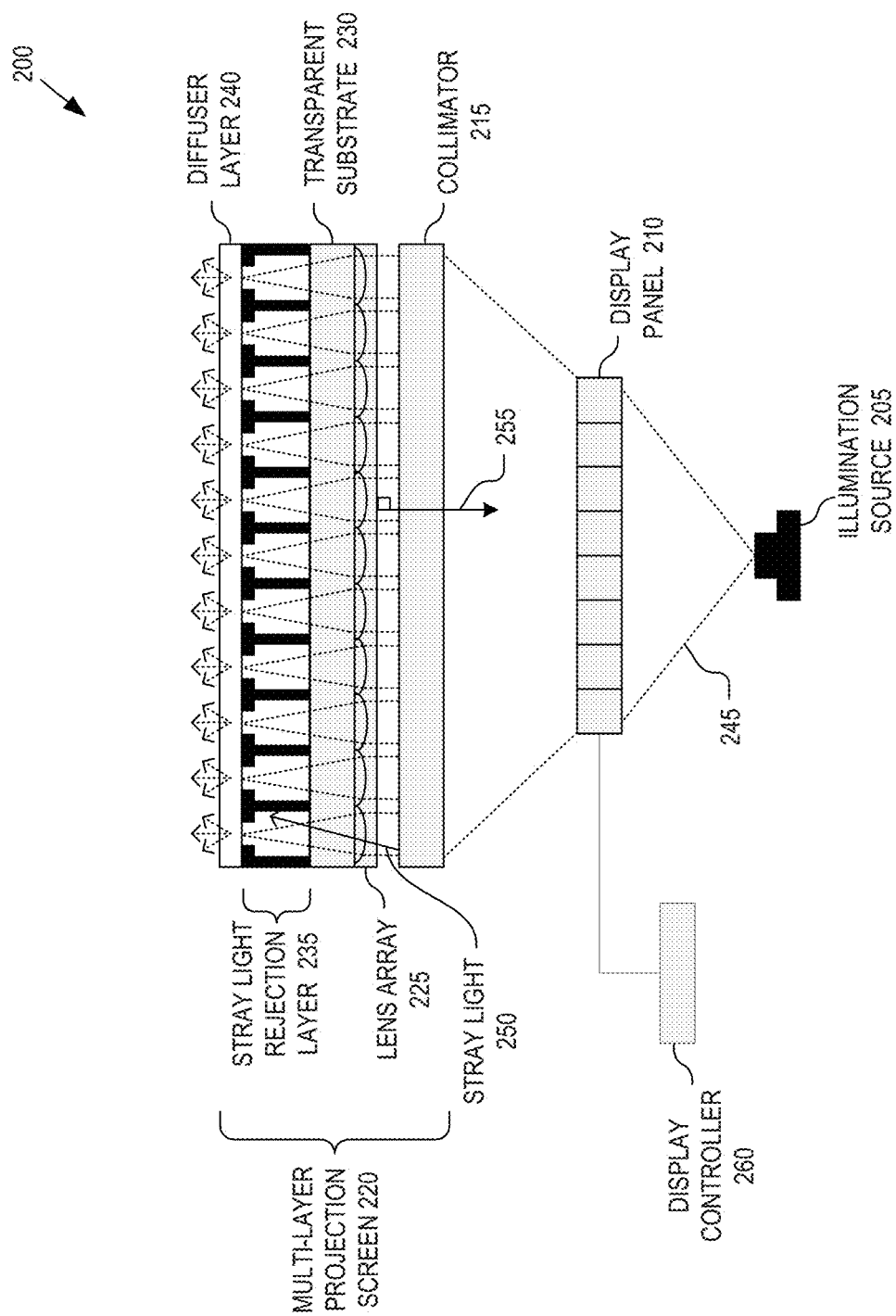
FIG. 2 is cross-sectional illustration of a rear projection display including a multi-layer projection screen that blocks stray light, in accordance with an embodiment of the disclosure.

FIG. 2 is cross-sectional illustration of a rear projection display 200 including a multi-layer projection screen that selectively projects only some angularly separated light, in accordance with an embodiment of the disclosure. The illustrated embodiment of rear projection display 200 includes a light source 205, a display panel 210, a collimator 215, and a multilayer projection screen 220. The illustrated embodiment of multi-layer projection screen 220 includes a lens array 225, a transparent substrate 230, a stray light rejection layer 235, and a diffuser layer 240.

During operation light source 205 emits display light 245 onto display panel 210. Light source 205 may be implemented using a variety of lamp technologies including light emitting diodes ("LED"), fluorescent lights, or otherwise. In the illustrated embodiment, light source 205 is a point source illuminator that generates divergent light. Of course, multi-layer projection screen 220 may be used with other types of light sources.

Display light 245 illuminates the backside of display panel 210, which spatially modulates an image onto display light 245. In the illustrated embodiment, display panel 210 is a transmissive pixel array, such as a liquid crystal display ("LCD"). Of course, other display panel technologies may be using including liquid crystal on silicon ("LCoS") panels, organic LED ("OLED") display panels, or otherwise. Although FIG. 2 illustrates display panel 210 in a rear illumination configuration, front illumination configuration may be implemented. Furthermore, direct emission panels (e.g., OLED) may be used, thus in these embodiments light source 205 would be integral with display panel 210. If alternative display technologies, such as OLED, LCoS, or direct microLED arrays are used, one or more additional optical layers may need to be introduced to control the angular spread of the emitted light.

Display panel 210 may include or couple to a display controller 260 comprising circuitry to selectively operate pixels that are to be illuminated by light source 205. In one embodiment, display controller 260 is pre-programmed or otherwise configured to compensate at least in part for overlap between an area of collimator 215 that is illuminated both by light from light source 215 and by other light from another light source (not shown). For example, display controller 260 may include or otherwise have access to configuration information that indicates a correspondence to two pixels of different respective pixel arrays—e.g., where the two pixels have been identified, based on calibration testing, as illuminating the same point in collimator 215 with light from different respective light sources. Based on such configuration information, display controller 260 may supplement artifact mitigation techniques described herein by variously adjusting operation of at least one of the two pixels—e.g., by adjusting operation of an entire row or column of pixels. For example, luma and/or chroma information of video data to operate a specific pixel may be adjusted based on the identified correspondence of the pixel to another pixel of a different pixel array.

In the illustrated embodiment, display light 245 output from display panel 210 is divergent. As such, collimator 215 is interposed between multi-layer projection screen 220 and display panel 210. Collimator 215 reduces the divergence of display light 245 such that it is substantially collimated along a trajectory that is near normal to a surface of transparent substrate 230. In practice, collimators (including collimator 215) are not 100% effective and thus some light remains divergent from scattered or diffracted light. Furthermore, display light incident near the periphery of display panel 210 or incident upon internal seams of any one of the components of rear projection display 200 may be refracted/reflected along non-normal trajectories. This light is referred to as "stray light" (e.g., stray light 250), which reduces the sharpness or fidelity of the image generated by rear projection display 200. For the purposes of this application, stray light 250 is defined as display light incident upon the backside of multilayer projection screen 220 having an oblique trajectory that deviates more than a threshold angle from a normal 255 of transparent substrate 230 or other planar surfaces of multi-layer projection screen 220. In one embodiment, the threshold angle is approximately 5 degrees. Of course, in other embodiments, the threshold angle may be greater or smaller than 5 degrees. In another design, such as that including a stray light rejection concentrator structure, a threshold angle may be ±25 degrees.

Stray light 250 detracts from the image quality of rear projection display 200 since light output from a given display pixel of display panel 210 and intended for a given image pixel location on the projection screen could end up incident on the image pixel location associated with an adjacent display pixel. This scenario is deleterious to image quality. Accordingly, multi-layer projection screen 220 includes stray light rejection layer 235, which blocks stray light 250 from reaching diffuser layer 240 upon which the image plane for display light 245 is formed. Not only does multi-layer projection screen 220 reduce or block stray light 250, but it also serves to increase the display contrast of the projection screen by reducing ambient reflections.

The collimated display light 245 is incident upon lens array 225 after passing through collimator 215. Lens array 225 focuses display light 245 across transparent substrate 230, through transparent pathways between opaque side walls within stray light rejection layer 235, and onto diffuser layer 240. If portions of display light 245 have sufficiently oblique trajectories that exceed the threshold angle (e.g., stray light 250), these rays end up incident upon the opaque side walls and absorbed or blocked. In one embodiment, the opaque side walls are fabricated of a material having an index of refraction substantially similar to that of the transparent pathways to discourage total internal reflections of stray light 250 and encourage absorption of stray light 250.

As previously mentioned, diffuser layer 240 operates as the image plane for display light 245 and serves to increase the divergence of display light 245 emitted from the frontside of rear projection display 200 into the viewing environment. In other words, diffuser layer 240 increases acceptable viewing angles for rear projection display 200.

Not only does stray light rejection layer 235 improve image sharpness by reducing stray light 250 from one pixel entering into the optical path of an adjacent pixel, but stray light rejection layer 235 also serves to increase image contrast. In the illustrated embodiment, the opaque side walls surrounding the transparent pathways of each pillar structure are formed of a dark or black pigmented material (e.g., black polymer). As such the front side of stray light rejection layer 235 is perceived as a substantially black surface, which reduces back reflections of ambient light. To further reduce back reflection of ambient light, the surface area of the exit apertures of each pillar structure of stray light rejection layer 235 is smaller than its corresponding entrance aperture adjacent to transparent substrate 230. Various embodiments of stray light rejection layer 235 are discussed in greater detail in connection with FIGS. 7A-7C.

Rear projection display 200 is just one example of a display system that projects respective light from multiple sources, directly or indirectly, onto collimation structures, where some portion of the collimation structures receives overlapping light from different sources. Other embodiments omit structures such as display panel 210—e.g., where a portion of an image is instead projected by a different type of light source directly onto collimator 215.

Figure 3A:
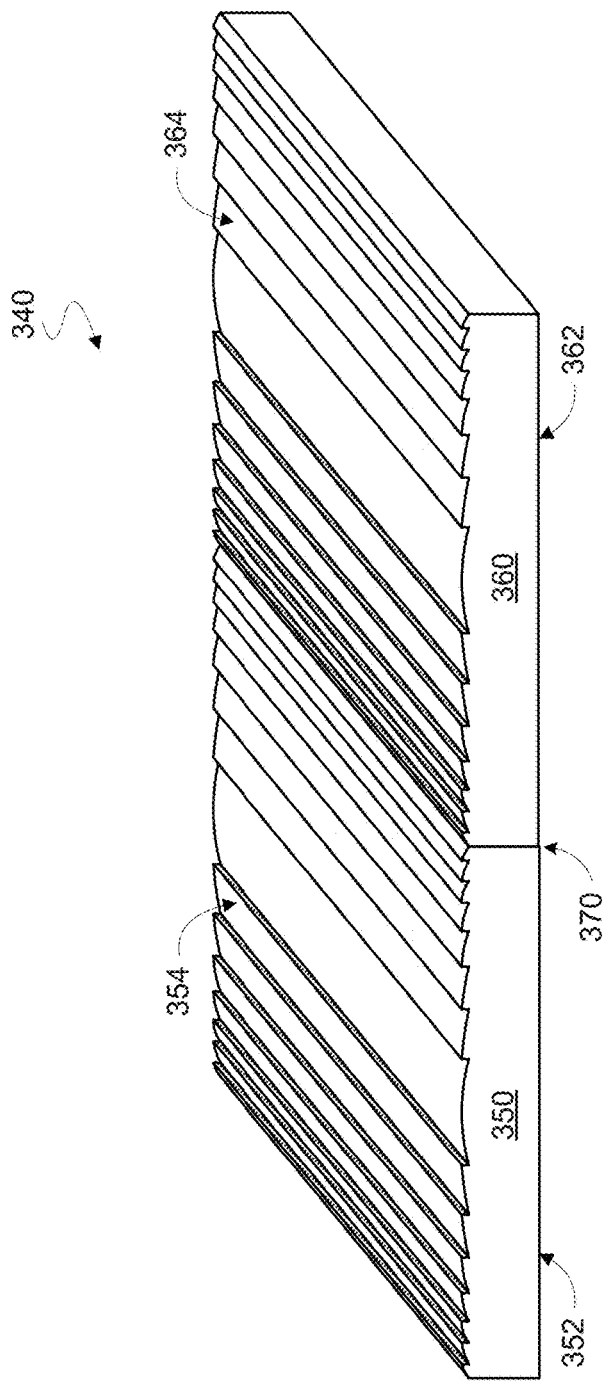
FIG. 3A is a cross-sectional illustration of a multi-layer projection screen including light collimation structures according to an embodiment.
Figure 3A:
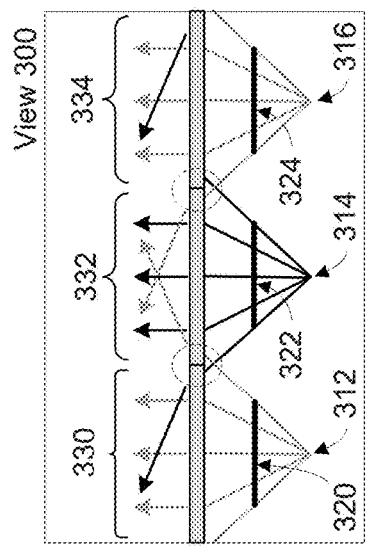

FIG. 3A shows a cross-sectional view 300 of a display system according to an embodiment. The display system of view 300 may have some of all features of one of rear projection displays 100, 200, for example.

In this embodiment, portions of the components of a display panel system are illustrated from a cross-sectional view as including an illumination layer comprising light sources 312, 314, 316 to variously emit display light at a limited angular spread so the display light is directed toward a respective one of pixel arrays 320, 322, 324 of a display layer. When display light (including a corresponding image sub-portion) encounters a screen layer including collimation structures 330, 332, 334, a magnified version of the image sub-portion is projected onto a diffuser layer (not shown) of the screen layer so that it is viewable to the user. Collimation structures 330, 332, 334 may be physically distinct structures (e.g., distinct plates, films, film stacks or the like) or may be different regions of a contiguous material or stack of materials—e.g., where such regions are distinguished from one another by respective patterns of light directing facets.

Each of light sources 312, 314, 316 is configured to emit a divergent projection beam having a limited angular spread that is directed toward a specific corresponding one of pixel arrays 320, 322, 324. In an embodiment, a distance between two of the pixel arrays 320, 322, 324 which are closest to one another is greater than a distance between adjacent pixels in either one of those two pixel arrays. For example, a distance between adjacent pixel arrays may be in a range of 7-20 times the size of a single pixel and/or in a range of 40-100 times the distance between pixels of a single pixel array.

In one embodiment, a divergent projection beam from one of light sources 312, 314, 316 may be substantially shaped as a cone (circular aperture) or an inverted pyramid (rectangle/square aperture). Additional optics may be disposed over each light source in the array of light sources to define the limited angular spread (e.g. 20-70 degrees) and/or cross-sectional shape of divergent projection beam emitted from the light sources. The additional optics (including refractive and/or diffractive optics) may also increase brightness uniformity of the display light so that the intensity of divergent projection beam incident upon each pixel in a given pixel array is substantially similar.

As illustrated in cross-sectional view 300, collimation structures 330, 332, 334 of the display system may each correspond to a respective one of light sources 312, 314, 416 and/or corresponding to a respective one of pixel arrays 320, 322, 324. For example, light source 314 may direct light through pixel array 322, where collimation structures 332 provides for collimated propagation of a majority of such light toward diffuser layer structures (not shown) of the display system. Light source 312 may similarly direct light through pixel array 320 into collimation structure 330, where light source 316 directs light through pixel array 324 into collimation structure 334.

An illustrative device 340, also shown in FIG. 3A, is one example of collimation structures that might be included in the display system according to an embodiment such as that represented in view 300. Device 340 includes collimation structures 350, 360 that adjoin one another at an interface region 370. Collimation structures 350, 360 may each be disposed over a respective light source (not shown), where respective sides 352, 362 of collimation structures 350, 360 each receive light from a corresponding one of such light sources. Collimation structures 350, 360 may provide for collimated propagation of light from sides 354, 364 that are opposite sides 352, 362, respectively.

In the illustrative embodiment shown, side 354 has a Fresnel pattern that is bilaterally symmetric with respect to a plane extending through collimation structures 350 in parallel with the interface region 370. Alternatively or in addition, side 364 may have a Fresnel pattern that is bilaterally symmetric with respect to a plane extending through collimation structures 360 in parallel with the interface region 370. However, any of a variety of other patterns of facets to collimate light may be provided, according to different embodiments. For example, a circular Fresnel pattern, radially symmetric around an axis extending through opposite sides of a collimation structure, may provide for light collimation according to another embodiment.

In some embodiments, divergent projection beams from different light sources may overlap. The circled regions in cross-sectional view 300 represent areas of light overlap where collimation structures adjoining one another. For example, a portion of light from light source 312 may enter collimation structure 332, and/or a portion of light from light source 314 may enter collimation structure 330. Alternatively or in addition, a portion of light from light source 316 may enter collimation structure 332 and/or a portion of light from light source 314 may enter collimation structure 334. Certain embodiments mitigate contrast (and/or other) artifacts in an image display by variously redirecting such portions of light toward paths that are more oblique, rather than less, to the direction of collimated light output from collimation structures 330, 332, 334.

Collimation structures 340, 350 may variously receive light that has been passed, for example, through respective pixel arrays of a display layer (e.g., including pixel arrays 320, 322, 324. Alternatively, light may be variously projected onto collimation structures 340, 350 by different image light sources independent of such light passing through any such pixel arrays. Accordingly, collimation structures 340, 350 may variously receive light from illumination sources similar to those in any of a variety of other, conventional types of rear projection display systems.

Figure 3B:
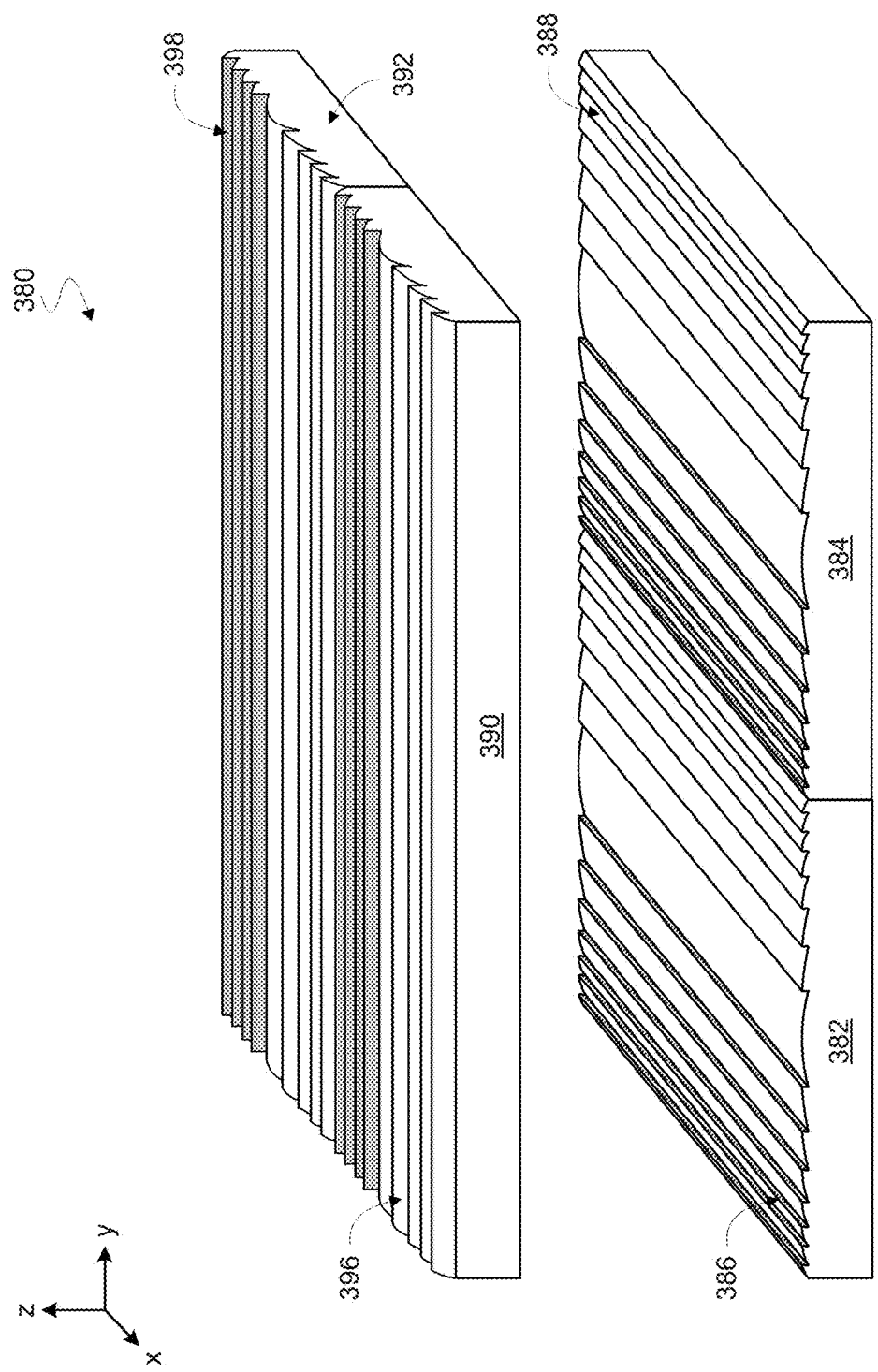
FIG. 3B is a stacked collimation structure of a multi-layer projection screen according to an embodiment.

In one embodiment, illustrated in FIG. 3B, light may be variously redirected by a stack 380 of layers including respective linear (or other) Fresnel structures may be used. In the illustrative stack 380, layers may include a Fresnel structures having an orientation that is orthogonal to a corresponding orientation of an adjoining layer. By way of illustration and not limitation, a first layer of stack 380 may include collimation structures 382, 384 (e.g., collimation structures 350, 360) that have formed therein respective linear Fresnel patterns 386, 388. Each of Fresnel patterns 386, 388 may be bilaterally symmetric, for example, with respect to a corresponding plane that extends in parallel with the x-z plane of the xyz coordinate system shown. A second layer of stack 380—e.g., closest to the first layer—may include collimation structures 390, 392 that have formed therein respective linear Fresnel patterns 396, 398. Each of Fresnel patterns 396, 398 may instead be bilaterally symmetric with respect to a corresponding plane that extends in parallel with the y-z plane of the xyz coordinate system. Some or all of structures 382, 384, 390, 392 may be formed, for example, from a UV-curable resin, replicated on top of a film made from Polyethylene terephthalate (PET) that has a refractive index (e.g. 1.62) which is relatively high—e.g., as compared to the refractive index (e.g. 1.42) of a filler material (not shown) that, in some embodiments, may be disposed between the first and second layers. The low index fill material may be used for bonding or otherwise adhering the multiple layers to one another, and may enable collimation of light that is incident at high angles—e.g., within ±40° with respect to a line normal to the x-y plane.

Figure 4:
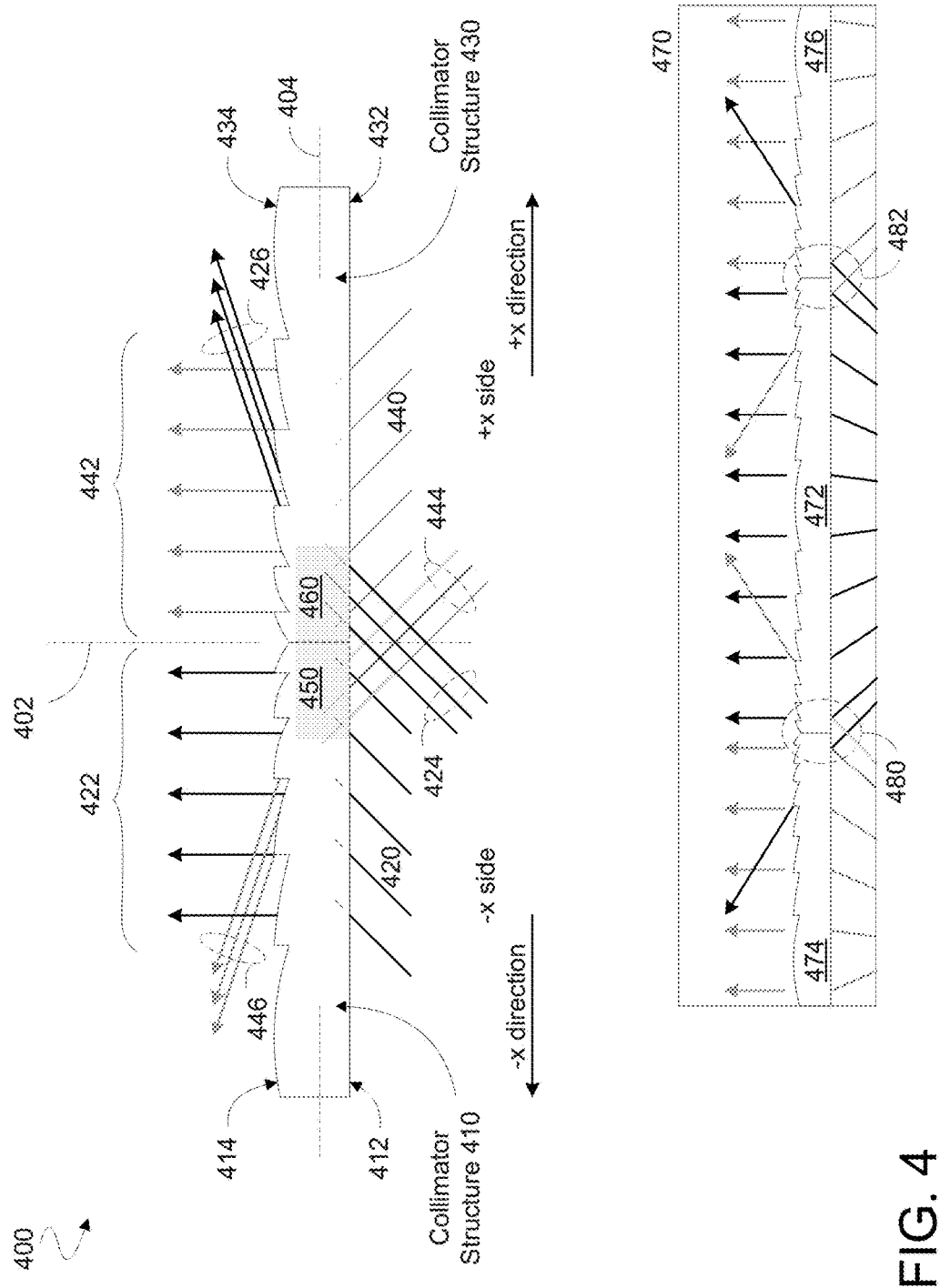
FIG. 4 is a cross-sectional illustration of a multi-layer projection screen including light collimation structures according to an embodiment.

FIG. 4 shows a cross-sectional view of a device 400 to provide rear projection of an image according to an embodiment. Device 400 may include features of one of rear projection displays 100, 200, for example. Device 400 is one example of display hardware including a multi-layer projection screen comprising light sources each to emit respective light, and collimation structures each disposed over a corresponding one of such light sources. A first collimation structure disposed over the first light source may collimate first light from the first light source in a particular direction of collimation. The first collimation structure may further receive and redirect other light from a second light source disposed under a second collimation structure that adjoins the first collimation structure. In an embodiment, the first collimation structure redirects the other light from the second light source away from the direction of collimation.

Device 400 is described herein with reference to planes 402, 404 that are orthogonal to one another and to the cross-sectional view of FIG. 4. In an embodiment, device 400 includes collimation structures that adjoin one another—e.g., as represented by the illustrative collimation structures 410, 430 that variously extend along plane 404 and that adjoin each other at plane 402. Collimation structure 410 of the multi-layer projection screen may be physically distinct from collimation structure 430—e.g., where collimation structures 410, 430 are different components of the same multi-layer projection screen or respective components of different multi-layer projection screens that are to adjoin one another. In another embodiment, collimation structures 410, 430 are adjoining regions of a contiguous layer (or stack of layers) of material configured to variously collimate light. Such adjoining regions may be distinguished, for example, by respective patterns (e.g., Fresnel patterns) to collimate light—e.g., where the respective patterns each have a different respective plane of symmetry or axis of symmetry. Where collimation structures 410, 430 are in one layer of stacked collimation layers, the stack may comprise alternating layers of relatively high index materials, to provide light collimation, and relatively low index fill materials that, for example, bond the high index layers to one another.

A region on a −x side of plane 402 may include collimation structure 410 and a first light source (not shown) disposed under collimation structure 410. Similarly, a region on a +x side of plane 402 may include collimation structure 430 and a second light source (not shown) disposed under collimation structure 430. Light 420 from the first light source may enter a side 412 of collimation structure 410 and/or light 440 from the second light source may enter a side 432 of collimation structure 430. Light 420, 440 may be variously collimated into respective collimated light 422, 442 propagating in a same direction (e.g., in parallel with plane 402). In one embodiment, light 420, 424, 440, 444 variously passes through pixel arrays (not shown) prior to being received at collimation sources 450, 460. Alternatively, such light may be variously projected onto collimation structures 450, 460 by image light sources independent of such light passing through any such pixel arrays.

However, an overlap of the respective regions illuminated by the light sources may result in light 424 from the first light source entering side 432 at a region 460 of collimation structure 430 that adjoins plane 402. Alternatively or in addition, such overlap may result in light 444 from the second light source entering side 412 at a region 450 of collimation structure 410 that adjoins plane 402. Whereas collimation structure 410 may redirect light 420 into collimated light 422—e.g., with a Fresnel pattern formed on a back side 414 thereof—collimation structure 410 may redirect light 444 away from the direction of collimation of light 422. For example, one or more facets in or on collimation structure 410—e.g., including the Fresnel pattern on side 414—may change a direction of light 444, resulting in redirected light 446 that, as compared to light 444, is at a larger angle (e.g., more perpendicular) to the direction of collimated light 422. Alternatively or in addition, collimation structure 430 may redirect light 424 away from the direction of collimation of light 442. Such redirection of light 424 and/or light 444 may mitigate contrast artifacts that might otherwise degrade the quality of a displayed image to be represented at least by light 422, 442. For example, some or all of light 422, 426, 442, 446 may be subsequently received by a stray light rejection layer (not shown) of device 400. Such a stray light rejection layer may absorb a majority of light 426 and light 446—e.g., where a majority of light 422 and light 442 is instead passed by the stray light rejection layer and included in the display of an image. Light directing structures such as those of device 400 (and/or device 470 discussed herein) may be fabricated using processing operations adapted from roll-to-roll film manufacturing technologies, for example.

FIG. 4 also shows a cross-sectional view 470 of a device—such as device 400—including collimation structures 472, 474, 476 to redirect light for improved projection of an image display according to an embodiment. In the illustrative embodiment shown, collimation structures 472, 474 adjoin each other at an interface region 480, and collimation structures 472, 476 adjoin each other at an interface region 482. Each of collimation structures 472, 474, 476 may receive and collimate respective light from a corresponding light source (not shown) that is located under that collimation structure. A given light source may illuminate its corresponding collimation structure—e.g., via a corresponding pixel array disposed therebetween—and may partially illuminate an adjoining collimation structure.

For example, a portion of light from the light source under collimation structure 474 may enter collimation structure 472 at interface region 480. Alternatively or in addition, a portion of light from the light source under collimation structure 476 may enter collimation structure 472 at interface region 482. To mitigate contrast artifacts due to the overlapping illumination at interface region 480 and/or at interface region 482, collimation structure 472 may variously redirect some or all such light away from a direction of the collimated light output by collimation structure 472. In an illustrative scenario according to one embodiment, light propagating at least partially in a +x direction, and received by collimation structure 472 at or near interface region 480, may be redirected by collimation structure 472 to propagate even more directly in the +x direction. Alternatively or in addition, light propagating at least partially in a −x direction, and received by collimation structure 472 at or near interface region 482, may be redirected by collimation structure 472 to propagate even more directly in the −x direction.

Figure 5A:
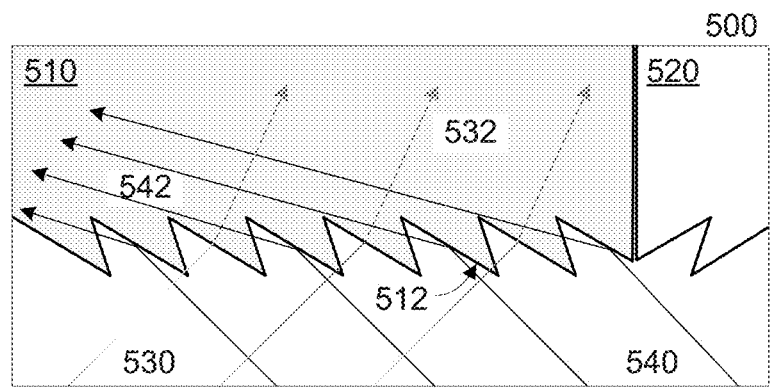
FIGS. 5A, 5B are cross-sectional illustrations each of a respective light collimator according to a corresponding embodiment.

FIG. 5A shows a cross-sectional view of a device 500 to provide rear projection of an image according to an embodiment. Device 500 may include some or all features of device 340, device 400 or the display system represented in one of cross-sectional views 300, 470, for example. In an embodiment, device 500 includes adjoining collimation structures 510, 520, where collimation structure 510 is to receive light 530 from a light source (not shown) located thereunder. Collimation structure 510 may further receive light 540 from another light source (not shown) located under collimation structure 520. For example, cross-sectional view 500 may be a detail view of regions 450, 460 according to one embodiment.

Collimation structure 510 may collimate light 530, but redirect light 540 away from a direction of such collimated light. In the illustrative embodiment shown, collimation structure 510 includes facets 512 formed by an exterior surface that is to receive light 530, 540. Facets 512 may form any of a variety of gratings or other such light directing structures. The respective angles of facets 512, the respective angles of incidence of light 530, 540, and an index of refraction of collimation structure 510, may result in refraction of light 530 at facets 512 to provide for at least partially collimated light 532 (e.g., where additional collimation takes place when light 532 exits collimation structure 510). By contrast, reflection of light 540 at facets 512 may also result (where a refractive index of collimation structure 510 is less than a refractive index of the media outside of collimation structure 510 at facets 512), providing for light 542 that is directed away from collimated light that is to propagate from collimation structure 510.

Figure 5B:
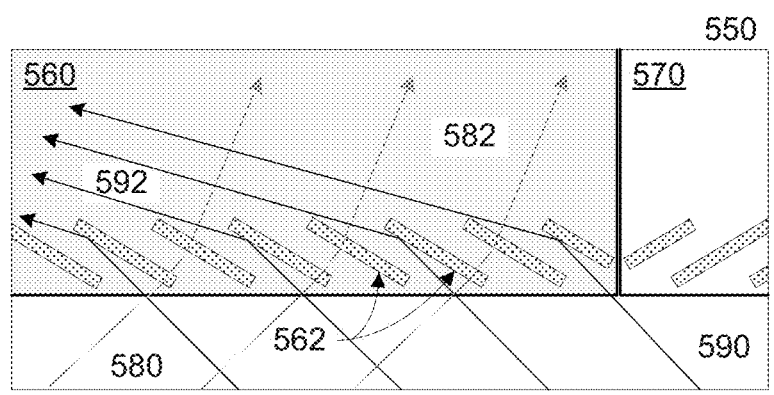

FIG. 5B shows a cross-sectional view of a device 550 to provide rear projection according to another embodiment. Device 550 may include features of device 340, device 400 or the display system represented in one of cross-sectional views 300, 470, for example. In an embodiment, device 550 includes adjoining collimation structures 560, 570, where collimation structure 560 is to receive light 580 from a light source (not shown) located thereunder. Collimation structure 560 may further receive light 590 from another light source (not shown) located under collimation structure 570. Instead of facets (e.g., facets 512) formed on an exterior surface, collimation structure 560 has formed therein blocks 562 positioned to variously expose light 580, 590 to a change in an index of refraction. Due to the respective angles of blocks 562, the respective angles of incidence of light 580, 590, and respective indices of refraction inside and outside of blocks 562, light 580 may refract at blocks 562 to provide for at least partially collimated light 582. By contrast, reflection of light 590 at blocks 562 may also result, providing for light 592 that is directed away from collimated light that is to propagate from collimation structure 560.

Figure 6A:
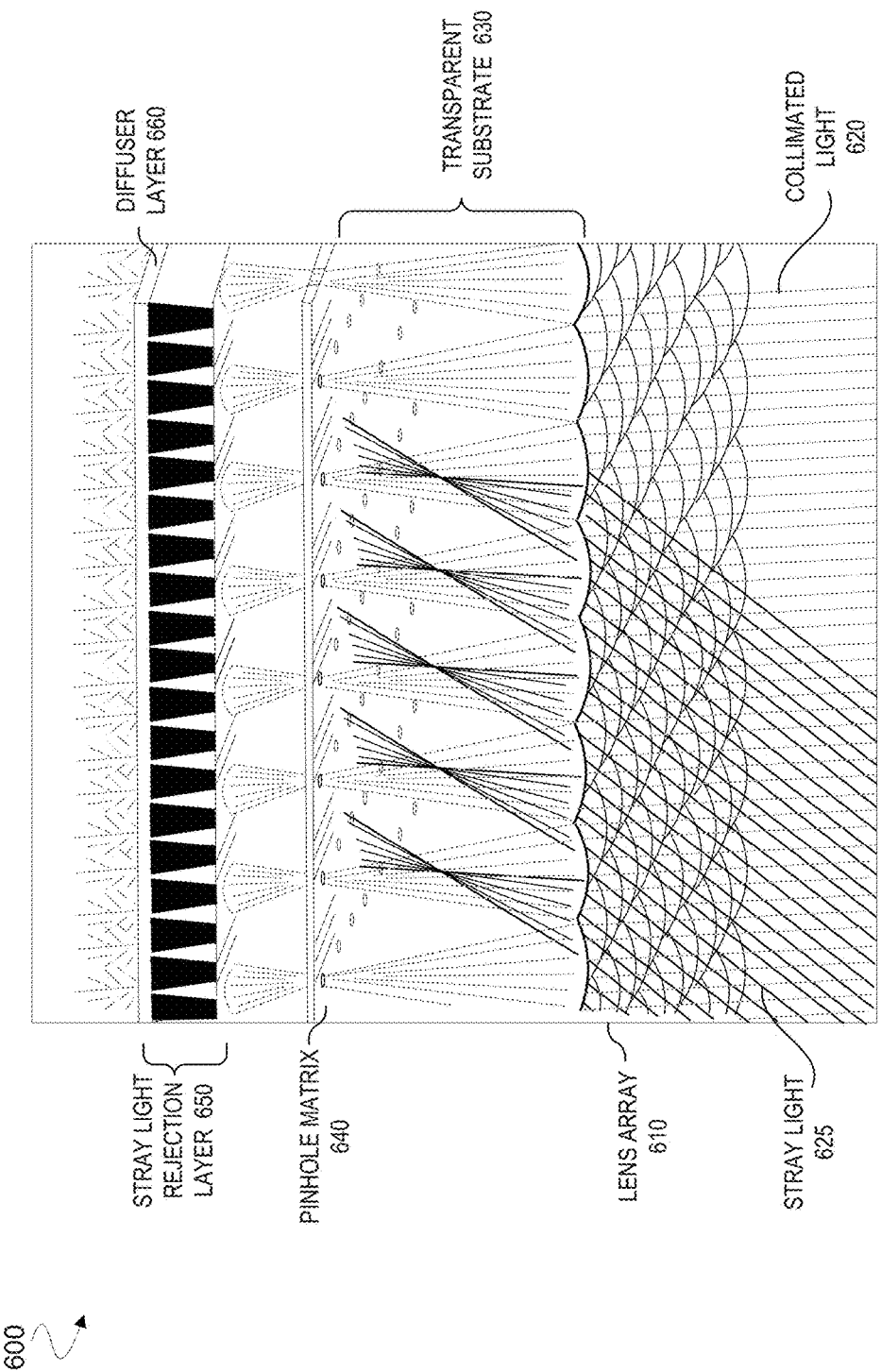
FIG. 6A is cross-sectional illustration of a rear projection display including a multi-layer projection screen that blocks stray light, in accordance with an embodiment of the disclosure.

FIG. 6A is cross-sectional illustration of a multi-layer projection screen 600 that redirects light and blocks at least a portion of such redirected light, in accordance with an embodiment of the disclosure. Multi-layer projection screen 600 may include one or more features of rear projection display 200, for example.

A lens array 610 of multi-layer projection screen 600 may be configured to receive light from one or more collimation structures (not shown) disposed under lens array 610. For example, lens array 610 may include, or be part of, pluralities of lenses each disposed over a different respective collimation structure of device 600. Although lens array 610 is shown as a rectilinear array, certain embodiments may provide any of a variety of additional or alternative arrays of lenses. For example, multi-layer projection screen 600 may additionally or alternatively include an array of lenses arranged in a hexagonal lattice configuration. In some embodiments, light 620, 625 is directed to successive layers of lenses—e.g., including a dual stack of one-dimensional ("1D") cylindrical lens arrays and having different respective orientations that are orthogonal to one another. Any of a variety of additional or alternative arrangements of lenses may be provided, according to different embodiments.

A given collimation structure of device 600—arranged in a configuration such as that shown in cross-sectional view 300, for example—may receive light from a corresponding light source, and further receive a portion of light from another other light source. Such a collimation structure may reduce the divergence of display light such that it is substantially collimated along a single direction of trajectory. Moreover, the collimation structure may further redirect other light (from a different light source) away from the direction of such collimation.

In the embodiment shown, lens array 610 receives from a collimation structure both collimated light 620 and stray light 625 that has been redirected to be more orthogonal to the direction of collimated light 620. For brevity, such redirected, oblique light is one example of what is referred to herein as "stray light." Lens array 610 focuses collimated light 620 across transparent substrate 630 and, in some embodiments, onto a pinhole matrix 640 that is positioned to variously locate pinhole structures at respective focal points for lens array 610. In an embodiment, pinhole matrix 640 is comprised of a dark colored polymer or other light absorbing material. Consequently, although lens array 610 may also provide some focusing of stray light 625, the oblique angle of stray light 625, relative to collimated light 620, may result in some or all stray light 625 being blocked at pinhole matrix 640. Light that passes through pinhole structures of pinhole matrix 640 may then enter a stray light rejection layer 650 of device 600. In another embodiment, pinhole matrix 640 may be omitted—e.g., where stray light rejection layer 650 absorbs or otherwise filters a majority of the stray light 625 that has passed through lens array 610.

Display light that passes through pinhole matrix 640 may subsequently propagate between opaque side walls within stray light rejection layer 650, and onto a diffuser layer 640. If portions of the display light have sufficiently oblique trajectories that exceed the threshold angle (e.g., any of stray light 625 that has not been previously blocked), these rays end up incident upon the opaque side walls and absorbed or blocked. In one embodiment, the opaque side walls are fabricated of a material having an index of refraction substantially similar to that of the transparent pathways to discourage total internal reflections of stray light and encourage absorption of stray light. A thin, forward-scattering diffuser layer 660 may increase acceptable viewing angles for multi-layer projection screen 600.

Figure 6B:
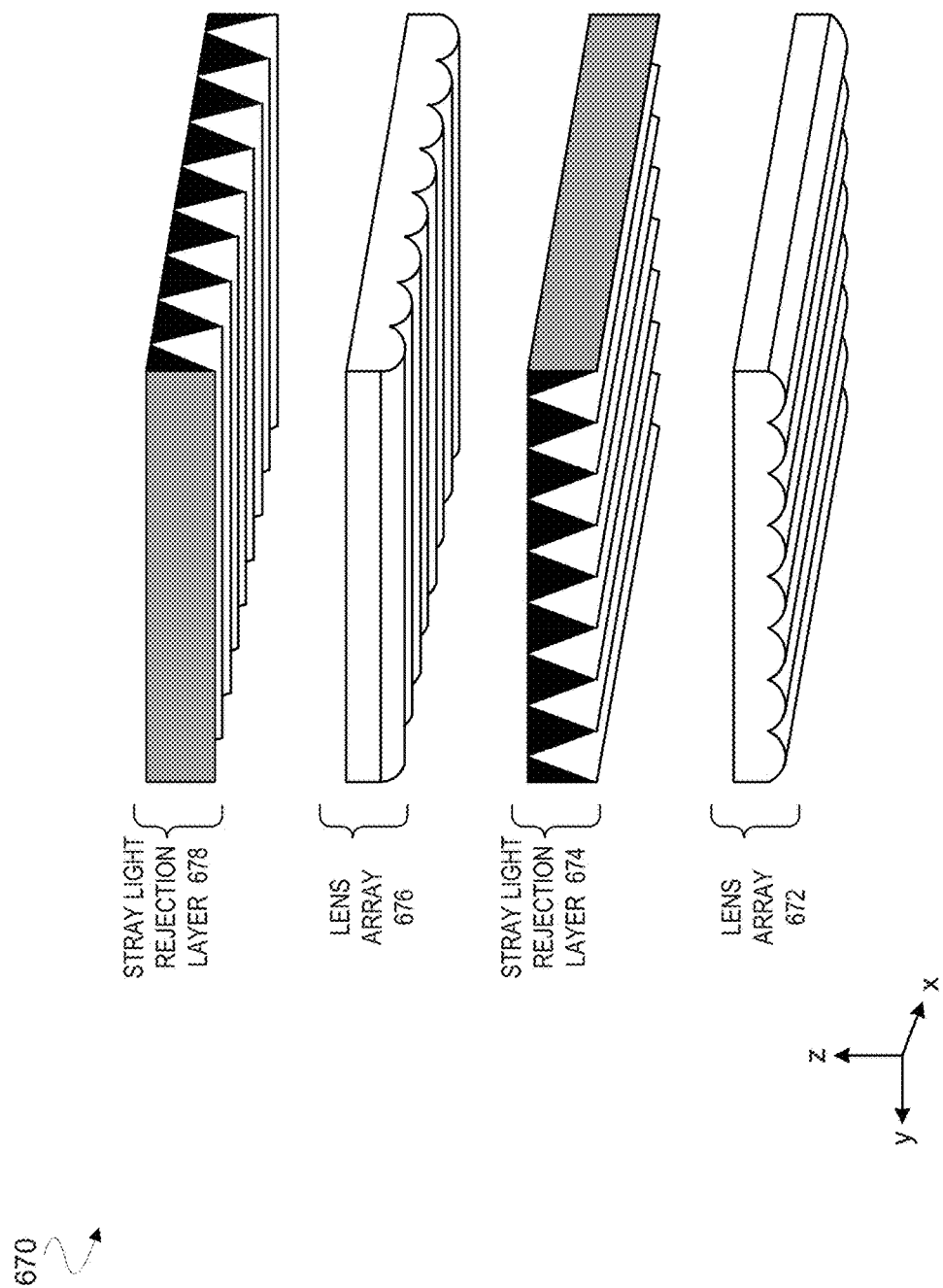
FIG. 6B is a perspective view of a stacked layers of light directing structures according to an embodiment.

As illustrated in FIG. 3B, for example, light directing structures may be variously oriented along respective axes—e.g., including two axes which are orthogonal to each other. FIG. 6B illustrates features of a multi-layer projection screen 670, according to one embodiment, that similarly includes variously oriented layers of light directing structures. Multi-layer projection screen 670 may include some or all of the features of rear projection display 200, stack 380, multi-layer projection screen 600 or the like. In the illustrative embodiment shown, multi-layer projection screen 670 comprises a lens array 672 including columnar lens elements that are oriented along an x-axis. Such columnar lens elements may receive light propagating substantially along the z-axis shown, where lens array 672 provides for such light to be variously focused with respect to the y-axis shown (e.g., but not along the x-axis). The focused light may then be provided to a stray light rejection layer 674 having structures—e.g., of any of a variety of stray light rejection layers discussed herein—that are also oriented along the x-axis. Although certain embodiments are not limited in this regard, multi-layer projection screen 670 may further have disposed between lens array 672 and stray light rejection layer 674 a pinhole matrix (not shown) and/or an array of slits that are oriented along the x-axis. In an embodiment, stray light rejection layer 674 passes a majority of light propagating along directions that, in the y-z plane, are within some threshold angle of the z-axis. The stray light rejection layer 674 may block a majority of any other light, for example.

Multi-layer projection screen 670 may further comprises a lens array 676 and stray light rejection layer 678, where columnar lens elements of lens array 676 and structures of stray light rejection layer 678 are variously oriented along the y-axis. Lens array 676 may receive light output by stray light rejection layer 678 and variously focus such light with respect to the x-axis (e.g., but not along the y-axis). This focused light may then be provided to a stray light rejection layer 678, which passes a majority of light propagating along directions that, in the x-z plane, are within a threshold angle of the z-axis. A pinhole matrix (not shown) and/or an array of slits that are oriented along the y-axis may be disposed between lens array 676 and stray light rejection layer 678, in some embodiments. Light that is output from stray light rejection layer 678 may then propagate into a diffusion layer (not shown) that is included in or optically coupled to multi-layer projection screen 670.

Figure 7A:
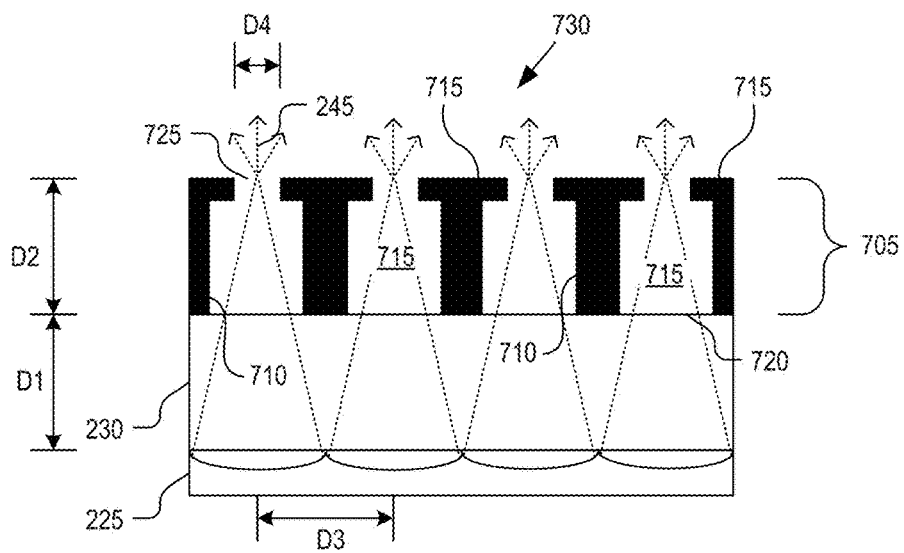
FIGS. 7A-7C are cross-sectional illustrations each of a respective stray light rejection layer in accordance with a corresponding embodiment of the disclosure.
Figure 7B:
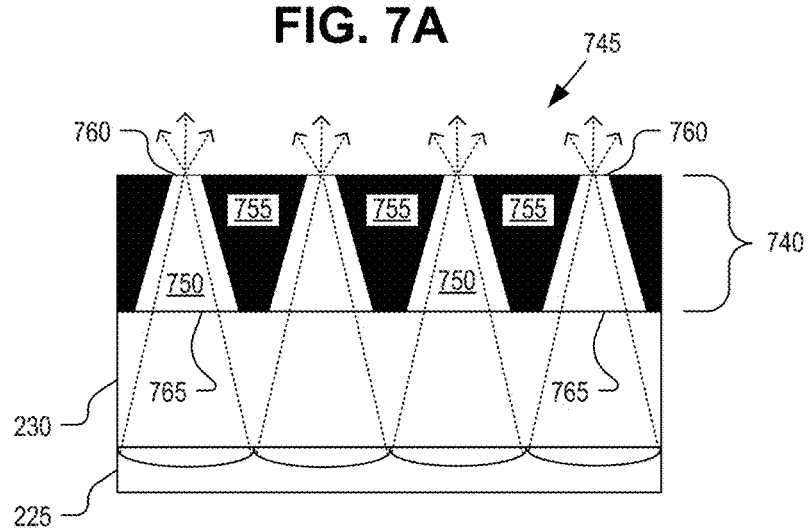
Figure 7C:
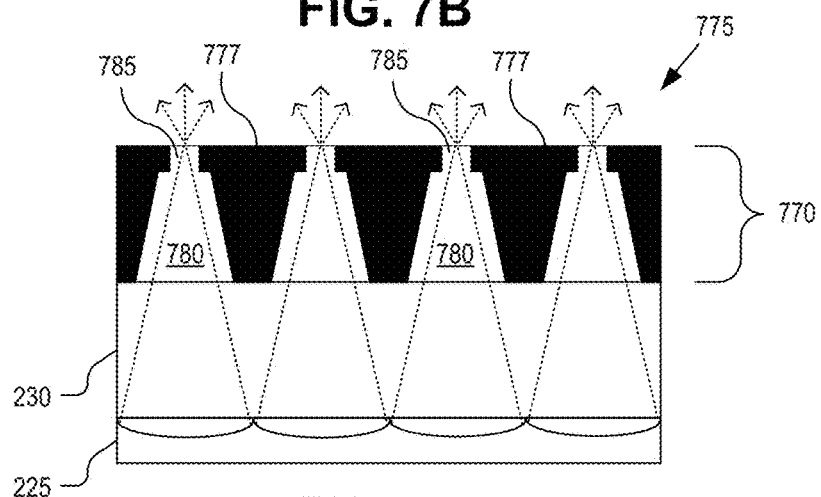

FIGS. 7A-7C illustrate various example implementations of a stray light rejection layer such as one of stray light rejection layers 235, 650. In the embodiments represented by FIGS. 7A-7C, light is variously focused into a respective stray light rejection layer without first passing through a pinhole matrix. For example, FIG. 7A is a cross-sectional illustration of a stray light rejection layer 705 having opaque side walls 710 with T-shaped cross-sections, in accordance with a first embodiment of the disclosure. Opaque side walls 710 define transparent pathways 715 each having an entrance aperture 720 and an exit aperture 725. The opaque sides 710 and transparent pathways 715 together form a 2D array of pillar structures 730 that make up stray light rejection layer 705.

As illustrated, exit apertures 725 have a smaller cross-sectional area than entrance apertures 720. This provides room for display light 245 to converge into exit apertures 720 and provides a mostly dark surface for high contrast on the emission surface of stray light rejection layer 705. The embodiment illustrated in FIG. 7A may have the following demonstrative dimensions D1=50 to 100 um, D2=50 to 150 um, D3=70 to 100 um, D4=5 to 20 um. Of course, these dimensions are mere examples and other dimensions may be used.

FIG. 7B is a cross-sectional illustration of a stray light rejection layer 740 with a 2D array of pillar structures 745 formed by transparent pathways 750 and opaque sidewalls 755, in accordance with an embodiment of the disclosure. The illustrated transparent pathways 750 and opaque sidewalls 755 have cross-sectional shapes that resemble truncated cones and define exit apertures 760 that are smaller than their corresponding entrance apertures 765.

FIG. 7C is a cross-sectional illustration of a stray light rejection layer 770 with a 2D array of pillar structures 775, in accordance with anther embodiment of the disclosure. 2D array of pillar structures 775 are formed by transparent pathways and opaque side walls 777. The transparent pathways have cross-sections resembling a truncated cone section 780 adjacent an entrance aperture and a rectangular nipple section 785 adjacent to an exit aperture.

The 2D array of pillar structures illustrated in FIGS. 7A-7C are merely representative and other cross-sectional shapes that provide smaller exit apertures than entrance apertures may be fabricated. A variety of different fabrication techniques may be used to form the stray light rejection layer on one side of transparent substrate 230 and lens array 225 on the other. In one embodiment, a rolling replication technique may be used where transparent substrate 230 (e.g., a sheet of Polyethylene terephthalate (PET) clear plastic) is fed under a rolling drum press. As transparent substrate 230 is fed under the drum press a transparent curable plastic is continuously dispensed over the surface of transparent substrate 230 in front of the drum press. The drum press then forms trenches corresponding to the opaque side walls of the 2D array of pillars into the transparent curable plastic. After UV or thermal curing of the molded transparent plastic, dark or black pigment is filled into the trenches, planarized (e.g., squeegeed), and cured.

Alternatively, lithographic techniques may be used to form the transparent pathways through stray light rejection layer 235. For example, light may be focused through lens array 225 to pattern transparent pathways through stray light rejection layer 235 using standard photolithography techniques. This technique benefits from passive self-alignment between lens arrays 225 and the transparent pathways of stray light rejection layer 235.

Figure 8A:
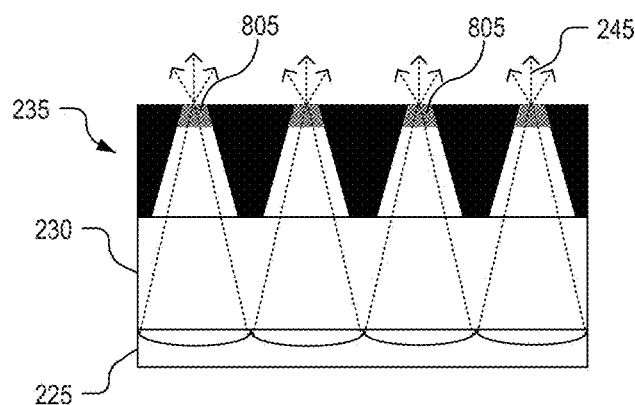
FIGS. 8A-8D illustrate example diffusers upon which an image plane for display light is formed, in accordance with embodiments of the disclosure.

FIGS. 8A-8D illustrate example implementations of diffuser layer 240 (e.g., diffuser layer 660) upon which an image plane for display light 245 is formed, in accordance with embodiments of the disclosure. FIG. 8A illustrates how diffusive material 805 is disposed within the transparent pathway proximate to the exit aperture of each pillar structure. Diffusive material 805 has a scattering effect on display light 245 causing the divergence of display light 245 to increase upon emission from the emission surface of stray light rejection layer 235. Diffusive material 805 may be implemented using a variety of techniques, such as embedding scattering particles within the transparent material of the transparent pathways. In one embodiment, the scattering particles may be transparent particles or beads having a different refractive index than the surrounding material of the transparent pathways. This embedded transparent particle technique reduces deleterious backscattering down the transparent pathways while increasing the divergence of the emitted display light 245.

Figure 8B:
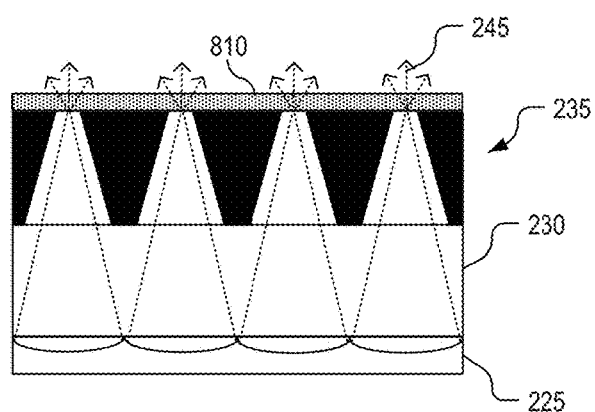
Figure 8C:
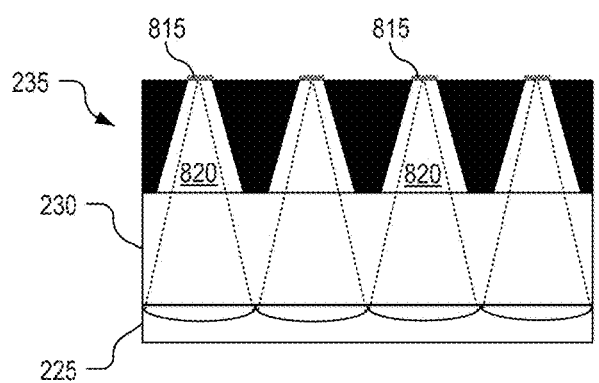
Figure 8D:
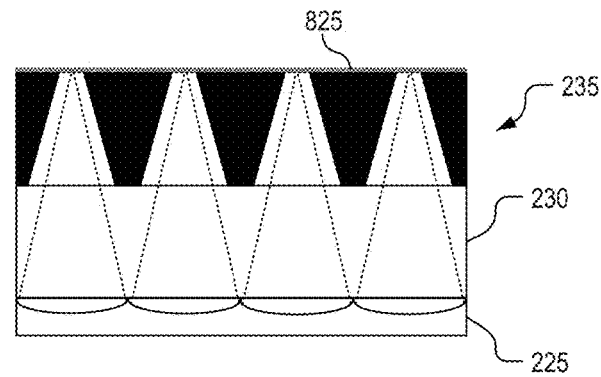

FIG. 8B illustrated an embodiment where a diffusive material layer 810 is disposed across the entire emission surface of stray light rejection layer 235. Diffusive material layer 810 may be fabricated using similar materials to diffusive material 805. FIG. 8C illustrates an embodiment where a texture 815 is formed into the emission surface of each transparent pathway 820. In one embodiment, texture 815 is the result of scoring, pressing, emblazoning, stamping, or otherwise roughing the surface of each transparent pathway 820. FIG. 8D illustrates an embodiment where a texture 825 is applied across the entire emission surface of stray light rejection layer 235. Diffusive material 805, diffusive material layer 810, textures 815, and texture 825 illustrate various structures for implementing diffuser layer 240. In various embodiments, one or more of the techniques illustrated in FIGS. 8A-D may be combined to improve the effectiveness of diffuser layer 240.

Figure 9:
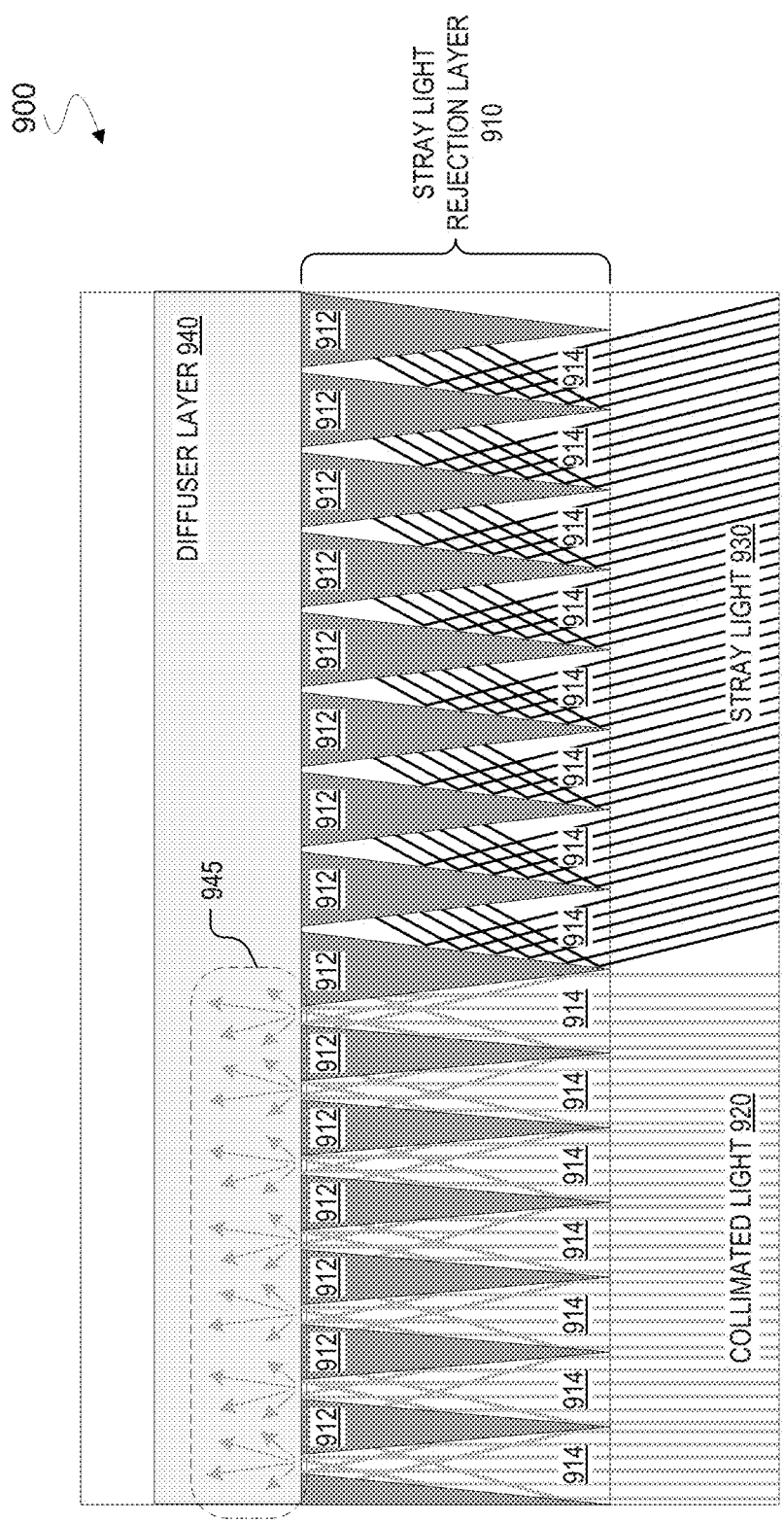
FIG. 9 is a cross-sectional view of a multi-layer projection screen according to an embodiment.

FIG. 9 illustrates features of a multi-layer projection screen 900 according to another embodiment. Multi-layer projection screen 900 may have features of display 100, one of devices 340, 400, 500, 550 or a display system represented in one of cross-sectional views 300, 470, for example.

In an embodiment, multi-layer projection screen 900 includes a stray light rejection layer 910 to receive light that has been variously redirected by one or more collimation structures (not shown) of multi-layer projection screen 900. Such light may include, for example, collimated light 920 received via a collimation structure, and stray light 930 that has been redirected—e.g., by the same collimation structure—to be more oblique to a path of collimated light 920. In one embodiment, collimated light 920 and stray light 930 are exchanged between such a collimation structure and stray light rejection layer 910 independent of any lens or lenses that might be included in multi-layer projection screen 900. For example, an optical path between the collimation structure and stray light rejection layer 910 may omit any lens, lens array etc.

Stray light rejection layer 910 may comprise pillar structures 912, where aperture regions 914 are variously formed between respective ones of pillar structures 912. The aperture regions 914 may variously extend through stray light rejection layer 910 to a diffuser layer 940 of multi-layer projection screen 900. In an embodiment, pillar structures 912 comprise a dark polymer or other material having a relatively low (e.g., 1.42) refractive index, as compared to a higher refractive index (e.g., 1.62) of an optically transmissive material in aperture regions 914.

Aperture regions 914 may variously receive collimated light 920 and stray light 930. Although collimated light 920 and stray light 930 are shown as being directed to different apertures, some or all of aperture regions 914 may receive both respective portions of collimated light 920 and respective portions of stray light 930. Due at least in part to the respective refractive indices of pillar structures 912 and aperture regions 914, the various paths of collimated light 920, and the geometry of pillar structures 912, a majority of collimated light 920 may be variously reflected by surfaces pillar structures 912 to pass through aperture regions 914. By contrast, the various paths of stray light 930 may result in a majority of stray light 930 being absorbed by surfaces pillar structures 912, and thus prevented from passing through aperture regions 914. As a result, collimated light 920 may contribute more than stray light 930 to image light 945 output to diffuser layer 940. As illustrated in FIG. 6B, for example, stray light rejection layers, such as those variously represented herein, may be oriented in any of a variety of directions. For example, a multi-layer projection screen according to an embodiment may include multiple stray light rejection layers having different respective (e.g., orthogonal) orientations.

In an embodiment, a light-transmissive material disposed in one aperture region 914 has a refractive index between 1.58 and 1.64—e.g., where the refractive index is 1.62. A material of a pillar structure 912 may have a refractive index between 1.48 and 1.54—e.g., where the refractive index is 1.52. A ratio of a refractive index of pillar structures 912 to a refractive index of aperture regions 914 may be between 1.03 and 1.09—e.g., where the ratio is 1.06. Alternatively or in addition, multi-layer projection screen 900 may have a height of approximately 100 microns—e.g., where an input of one aperture region 914 is 27 microns wide and an output of the aperture region 914 is 6 microns wide. In such an embodiment, the aperture region 914 has a half angle of approximately 6° (and a full angle of 12°). Such dimensions and materials of stray light rejection layer 910 may allow multi-layer projection screen 900 to forego any lens arrays and/or any pinhole matrix structures between stray light rejection layer 910 and collimator structures (not shown) of multi-layer projection screen 900. However, such dimensions and/or materials are not limiting on some embodiments, and may vary according to implementation-specific details.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize. These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A multi-layer projection screen comprising:
a first collimation structure positioned to receive first light from a first light source;
a second collimation structure physically adjoining the first collimation structure at an interface plane, the second collimation structure positioned to receive second light from a second light source, wherein a first region on a first side of the interface plane includes the first collimation structure and the first light source and a second region on a second side of the interface plane, opposite the first side, includes the second collimation structure and the second light source, wherein the first collimation structure is oriented to receive the first light and stray portions of the second light from the second light source, to collimate the first light in a direction of collimation and to redirect the stray portions of the second light away from the direction of collimation; and
a stray light rejection layer optically coupled to receive the first light and the stray portions of the second light via the first collimation structure, to pass a majority of the first light for inclusion as part of a projected image, and to prevent a majority of the stray portions of the second light from inclusion in the projected image.

2. The multi-layer projection screen of claim 1, wherein the second collimation structure is positioned to receive stray portions of the first light from the first light source and the second light from the second light source, to collimate the second light in the direction of collimation and to redirect the stray portions of the first light away from the direction of collimation, and wherein the stray light rejection layer is optically coupled to further receive the stray portions of the first light and the second light via the second collimation structure, to pass a majority of the the second light as part of the projected image, and to prevent a majority of the stray portions of the first light from inclusion in the projected image.

3. The multi-layer projection screen of claim 1, further comprising a first plurality of lenses disposed between the first collimation structure and the stray light rejection layer, the first plurality of lenses to focus the collimated first light through the stray light rejection layer.

4. The multi-layer projection screen of claim 3, further comprising a pinhole matrix disposed between the first plurality of lenses and the stray light rejection layer, the pinhole matrix to block the stray portions of the second light from the second light source.

5. The multi-layer projection screen of claim 1, the first light representing a first portion of the projected image, the second light representing a second portion of the projected image.

6. The multi-layer projection screen of claim 5, wherein the first portion and the second portion at least partially overlap one another.

7. The multi-layer projection screen of claim 1, wherein a first exterior surface of the first collimation structure to receive the first light, wherein the first exterior surface forms facets to redirect the stray portions of the second light.

8. The multi-layer projection screen of claim 7, wherein the facets form a grating.

9. The multi-layer projection screen of claim 1, wherein the first collimation structure forms a Fresnel pattern.

10. The multi-layer projection screen of claim 9, wherein the Fresnel pattern is bilaterally symmetric.

11. The multi-layer projection screen of claim 9, wherein the Fresnel pattern is radially symmetric.

12. he multi-layer projection screen of claim 1, wherein the multi-layer projection screen includes stacked layers of collimation structures, the stacked layers comprising:
a first layer including a first Fresnel pattern that is bilaterally symmetric with respect to a first plane, the first layer comprising the first collimation structure and the second collimation structure; and
a second layer including a second Fresnel pattern that is bilaterally symmetric with respect to a second plane that is orthogonal to the first plane.

13. A rear projection display comprising:
an illumination layer including a first light source to emit first light and a second light source to emit second light;
a display layer including a first transmissive pixel array to project a first image portion with the first light, and a second transmissive pixel array to project a second image portion with the second light; and
a projection screen including:
a first collimation structure positioned to receive the first light via the first transmissive pixel array and to receive stray portions of the second light via the second transmissive pixel array, the first collimation structure to collimate the first light in a direction of collimation and to redirect the stray portions of the second light away from the direction of collimation;
a second collimation structure physically adjoining the first collimation structure at an interface plane, wherein a first region on a first side of the interface plane includes the first collimation structure and the first light source, and wherein a second region on a second side of the interface plane, opposite the first side, includes the second collimation structure and the second light source; and
a stray light rejection layer optically coupled to receive the first light and the stray portions of the second light via the first collimation structure, to pass a majority of the first light for inclusion as part of a projected image, and to prevent a majority of the stray portions of the second light from inclusion in the projected image.

14. The rear projection display of claim 13, wherein the second collimation structure is positioned to receive stray portions of the first light from the first light source via the first transmissive pixel array and the second light from the second light source via the second transmissive pixel array, to collimate the second light in the direction of collimation and to redirect the stray portions of the first light away from the direction of collimation, and wherein the stray light rejection layer is optically coupled to further receive the stray portions of the first light and the second light via the second collimation structure, to pass a majority of the second light as part of the projected image, and to prevent a majority of the stray portions of the first light from inclusion in the projected image.

15. The rear projection display of claim 13, further comprising a first plurality of lenses disposed between the first collimation structure and the stray light rejection layer, the first plurality of lenses to focus the collimated first light through the stray light rejection layer.

16. The rear projection display of claim 15, further comprising a pinhole matrix disposed between the first plurality of lenses and the stray light rejection layer, the pinhole matrix to block the stray portions of the second light from the second light source.

17. The rear projection display of claim 13, the first light representing a first portion of the projected image, the second light representing a second portion of the projected image.

18. The rear projection display of claim 13, wherein a first exterior surface of the first collimation structure to receive the first light, wherein the first exterior surface forms facets to redirect the stray portions of the second light.

19. The rear projection display of claim 18, wherein the facets form a grating.

20. The rear projection display of claim 13, wherein the first collimation structure forms a Fresnel pattern.

21. The rear projection display of claim 13, wherein a point on the first collimation structure to be illuminated both with light received via a first pixel of the first transmissive pixel array and with light received via a second pixel of the second transmissive pixel array, the rear projection display further comprising:
display controller logic including circuitry configured to operate pixels of the first transmissive pixel array and the second transmissive pixel array, including the display controller logic to adjust an operation of one of the first pixel and the second pixel based on an identified correspondence of the first pixel with the second pixel.

* * * * *